United States Patent Office 3,498,820
Patented Mar. 3, 1970

3,498,820
METHOD OF COATING
Frederick E. Hawkins, Ambler, Pa., assignor to Certain-Teed Products Corporation, Ardmore, Pa., a corporation of Maryland
No Drawing. Filed Nov. 7, 1966, Ser. No. 592,305
Int. Cl. B05c 7/08; B44d 1/44
U.S. Cl. 117—54                                          7 Claims

ABSTRACT OF THE DISCLOSURE

A method is disclosed for applying a heat hardenable liquid coating composition to the interior surface of an asbestos-cement pipe including heating the pipe to a temperature of at least about 220° F., maintaining the temperature of the pipe in excess of about 220° F. for a relatively short period of time, for example one minute to three hundred minutes and cooling the pipe by at least about 15° F. A heat hardenable liquid coating composition is then applied to the interior surface of the pipe as it is rotated about its longitudinal axis, the rotation being continued until the coating composition forms a sag-free lining.

---

This invention relates to coating the interior surface of a pipe or other open-ended hollow object with a heat hardenable liquid coating composition and more particularly to a method for heat treating an asbestos-cement pipe prior to coating the interior surface thereof with a heat hardenable liquid coating composition.

Heretofore it has been proposed to line or coat the interior surface of asbestos-cement pipes with fluid impervious and chemically inert linings. The purpose of the lining is to protect the pipe from being degraded by corrosive fluids which flow through the pipe. In cases where the interior surface of the pipe must be cleaned from time to time, the lining permits the use of acid cleaners thereby facilitating removal of deposits, whereas, such acid cleaners would degrade part of the asbestos-cement composition if the pipe were not lined. To form a fluid impervious protective barrier and one that does not hinder the flow of fluids through the pipe, the lining should adhere firmly to the wall, be free of sags, ripples, pinholes, blisters and other surface defects and be of sufficient thickness to cover minor irregularities on the surface of the pipe.

Whereas there have been developed and made available various coating materials which are chemically resistant and fluid impervious, the application of such materials at high production rates to the interior surface of the pipe to form thereon a smooth lining free of surface defects and irregularities remains a problem. Such coating materials are applied generally in liquid form to the interior surface of the pipe by spraying the liquid thereon as the pipe is rotated about its longitudinal axis at a speed high enough to spread the coating material over the entire surface of the pipe. After the liquid coating material is applied, the rotation of the pipe is continued until the liquid layer of coating material hardens to the extent that it will not flow or sag when rotation is stopped.

Typical of the problems associated with the application at high production rates of liquid coating materials to the interior surface of the pipe are those encountered when applying a liquid epoxy resin coating composition, a coating material in common use and one which upon hardening becomes a fluid impervious and chemically inert substance. The liquid epoxy coating composition can be made up in the form of a solution of solid epoxy resin dissolved in a suitable volatile solvent or in the form of a mixture of a liquid epoxy resin and hardener which mixture may also contain an accelerator. Problems are encountered when either of these types of compositions are applied.

It has been found that if a solution of epoxy resin and volatile solvent is applied to the interior surface of a rotating pipe by spraying the solution thereon, it is virtually impossible to obtain a lining that is free of blisters, pinholes or other surface defects. This is because the thickness of the lining that can be applied upon one pass of the spraying apparatus is limited by the need to have the lining thin enough to permit the evaporation of the solvent from the surface of the lining. Applying a second coating of a solution reduces somewhat the number of surface defects but by no means insures the formation of a fluid impervious lining.

With respect to coating compositions comprised of a liquid epoxy resin, hardener and accelerator, it has been found that the various types of hardeners and accelerators that are available have different effects on the time it takes for the layer of coating to solidify to a sag-free state and the quality of lining formed.

Liquid epoxy resin compositions which contain hardeners and accelerators that are effective in solidifying at room temperature to a sag-free state in a relatively short period of time form linings which are not impervious to water, alkali, or acids. The desired chemical resistance of the lining can be attained by not using such hardeners and accelerators, but such compositions when applied to the pipe at ambient temperature form linings which do not reach a sag-free state until the passage of an excessively long period of time, for example, one hour. During this period of time, the pipe must be rotated about its longitudinal axis at a speed high enough to develop sufficient centrifugal force to maintain the hardening liquid lining sag free. The utilization of such types of compositions creates a bottleneck in the production process. Another disadvantage of such compositions is that the lining while in a state of hardening often develops a permanent blush which detracts from the appearance of the pipe.

The solidifying of liquid epoxy coating compositions which are slow reacting at ambient temperature can be accelerated by applying the composition of a heated pipe. The heat transferred from the pipe to the composition accelerates the hardening reaction. However, it has been found that if the liquid composition is applied to a pipe having a temperature of about 120° F., blisters and pinholes are formed in the lining with the result that the lining is defective. Temperatures greater than about 120° F. cause an increase in the number of blisters that are formed and it is at these temperatures where the hardening is accelerated to a satisfactory degree. It is believed that the blisters are caused by expanding gases, particularly water vapor, within the pores of the pipe wall, the expansion of the gases being triggered by the heat of the pipe. It is also theorized that the heat of the pipe causes water trapped within the inner body portions of the asbestos-cement composition to move toward the interior surface of the pipe wall and contribute to blister formation.

A method has heretofore been proposed whereby the heat of a hot pipe can be utilized to speed up the hardening of the liquid coating composition while avoiding the blister and pinhole formation problem. This method generally consists of applying to a heated pipe a liquid resin coating composition which has substantially the same temperature as the pipe while maintaining the outside of the pipe wall in a state of cooling. However, it has been found that this method cannot be relied upon to avoid consistently the blister and pinhole formation problem. In addition, this method has other disadvantages. For example, it is reported that when coating the interior surface of a pipe that has a wall thickness of greater than about 2 inches, it is necessary to provide additional equipment for cooling the outside of the pipe such as, for example, equipment for spraying water on the exterior pipe wall. Another disadvantage of this method is that if the coating has been applied to a pipe which has a temperature above 212° F., it is necessary that the moisture within the pipe wall be driven off before the liquid coating composition is applied. This necessitates that the pipe be dried for long periods of time at high temperatures, e.g., as much as 16 hours at 240° F. From a production standpoint, such drying procedure is intolerable and consequently the utilization of temperatures above 212° F. where the coating composition hardens at advantageously fast rates are generally avoided.

Thus, according to known methods, it is not possible to consistently form high quality linings at high production rates on the interior surface of an asbestos-cement pipe by applying thereto compositions comprised of liquid epoxy resins and hardeners, such compositions being referred to hereinafter as heat-hardenable liquid-coating compositions.

It is therefore an object of this invention to provide an improved method for applying heat-hardenable liquid-coating compositions to the interior surface of a pipe or other open-ended, hollow object.

It is an additional object of this invention to provide an improved method for applying a heat-hardenable liquid-coating composition to the interior surface of a heated asbestos-cement pipe to form thereon a smooth lining which is free of blisters and other surface defects.

It is still another object of this invention to provide an improved method for coating the interior surface of a heated asbestos-cement pipe by applying thereto a heat-hardenable liquid coating which solidifies to provide a smooth blister-free lining without having to dry the pipe before application of the coating.

In accordance with this invention, the above objects are attained by first heating the pipe to a high temperature for a relatively short period of time, cooling the pipe somewhat and then substantially immediately after the cooling applying a heat-hardenable liquid-coating composition to the interior surface of the hot pipe.

This invention is primarly directed to heat treating an asbestos-cement pipe or other open-ended hollow fibrocement object which has been cured, for example by high pressure steam curing, but which, nevertheless, still contains water within the walls or body portions of the object which tends to move toward the interior surface of the wall when the object is heated to temperatures of about 120° F. and above. Generally, the amount of water within the walls of the pipe may be anywhere from about 4 to 15 percent by weight of the pipe. Asbestos-cement pipes normally contain from about 4 to 7 percent by weight of water which has not entered into the hydration reaction. Additional amounts of water may be picked up by the pipe from the atmosphere. In cases where the pipe is stored outside and exposed to rain, it is not unusual for the pipe to contain as much as 15 or more percent by weight of water.

More specifically, this invention provides a method for treating an asbestos-cement pipe or other open-ended hollow fibro-cement objects prior to coating the interior surface thereof with a heat-hardenable liquid-coating composition comprising providing a cured open-ended hollow fibro-cement object having water within the wall of the object, heating the innermost body portions of said object to a temperature within on initial temperature range to raise the temperature of said body portions to at least about 220° F., maintaining the temperature of said body portions within said initial temperature range for a period of time substantially less than it takes the heat to completely dry the object, and cooling said body portions to a temperature within a second temperature range to lower the temperature of the body portions by at least about 15 Fahrenheit degrees and preferably by at least about 20 Fahrenheit degrees thereby readying the object for the substantially immediate application of a heat-hardenable liquid-coating composition to the interior surface thereof.

By utilizing the method set forth above it is possible to apply heat-hardenable liquid-coating compositions to heated asbestos-cement pipes or similar objects and obtain smooth linings free of pinholes and blisters and other surface defects while avoiding the problems attendant with and inherent in known methods for coating.

As mentioned hereinabove, one of the major problems encountered with practicing hertofore known methods of coating is that the asbestos-cement pipe must be heated for inordinately long periods of time to completely dry the pipe before the heat-hardenable liquid coating can be applied to a hot pipe in order to obtain linings that are free of blisters and pinholes. As explained above, the cause of the blister and pinhole formation is attributable to water moving toward the pipe surface. The purpose of the drying therefore is to drive off all of the water and therefore rid the pipe of the blister, pinhole inducer. It has now unexpectedly been found that it is not necessary to dry completely the pipe in order to avoid blister and pinhole formation in a layer of liquid coating applied to a hot pipe. By following the method of this invention, much time can be saved and high quality linings can be provided if the temperature of the innermost body portions of the pipe is raised to above about 220° F. and maintained at such temperature for relatively a short period of time, lowering the temperature by at least about 15° F. and applying a heat-hardenable liquid-coating composition, for example, a liquid epoxy-resin hardener composition, to the interior surface of the pipe shortly after the cooling has been effected.

Thus, in accordance with this invention a heat-hardenable liquid coating composition can be applied to the interior surface of an asbestos-cement pipe by first heating the pipe to raise the temperature of its innermost body portions to at least 220° F. and preferably higher, maintaining the temperature of said body portions at about 220° F. or higher for a period of time substantially less than it takes for the heat to drive off all of the water from within the pipe walls, cooling the pipe to lower the temperature of the body portions by at least about 15° F. but not to an extent that there will not be sufficient heat within the pipe walls to accelerate the hardening of the coating composition, rotating the cooled but still hot pipe about its longitudinal axis and then applying to the interior surface of the pipe a heat-hardenable liquid-coating composition by any conventional means, for example, by spraying. Having applied the layer of coating, rotation of the pipe should be continued for at least a period of time until the coating material has hardened to the extent that the layer of coating will not sag when rotation is stopped.

In accordance with this invention, the asbestos-cement pipe or similar object can be heated by any suitable equipment, for example a tunnel through which hot air is circulated to raise the temperature of the innermost wall portions of the pipe to about 220° F. or higher. Preferably the pipe should be heated to a temperature falling within the range of about 220° F. to 300° F. It should be understood, however, that higher temperatures can be used. The time that the pipe is maintained within this temperature range or at least above 220° F. will vary depending on the temperature of the pipe and the wall thickness of the pipe. In general, pipes having a wall thickness of from about a fraction of an inch, for example, one-third of an inch to about a couple of inches which have been heated to a temperature within the range of 220° F. to 300° F. should be maintained at a temperature within said range for about 1 to 300 minutes, the thicker walled pipes generally being maintained within this temperature range for the longer periods of time. The moisture content of the pipe will also influence the temperature to which it is heated and maintained thereat.

For the same temperature, pipes with greater amounts of water should be maintained at the temperature for longer periods of time than pipes with lower amounts of water. Pipes with the higher water content should be heated to higher temperatures than pipes with lower water content if the time at which the pipes are maintained at their respective temperature is about the same. The temperature of the pipe may be maintained within the above time period for longer periods of time but to no real advantage and as such it is unnecessary. The advantage of utilizing the method of this invention is evident when considering that it would generally take anywhere from 10 to 48 hours to completely dry a pipe heated to a temperature within this range, the time depending on temperature, water content and wall thickness of the pipe.

Having heated the pipe as above described, its temperature should then be lowered by at least about 15° F. and preferably 20° F. The cooling may be accomplished with any suitable equipment, for example, a tunnel through which hot air is circulated, i.e., air which is heated but is at a lower temperature than the temperature it is desired to cool the pipe. It is advantageous from a production standpoint that the pipe be cooled as fast as possible. Pipes having a wall thickness of about a fraction of an inch, for example, one-third of an inch to about a couple of inches can be cooled to a temperature within the range of about 180° F. to 205° F. in a tunnel through which air at about 150° F. to 180° F. is circulated in about 10 to 100 minutes. It should be understood that other means can be utilized which will reduce the temperature of the pipe more quickly.

The number of degrees the temperature of the pipe is lowered will depend on a number of factors.

In this respect, the characteristics of the coating composition being applied must be taken into consideration. The temperature of the pipe after cooling should be hot enough to promote setting of the coating composition within a reasonable time, for example 5 to 10 minutes and thus the setting characteristics of the composition will influence the temperature to which the pipe is lowered. On the other hand, the temperature of the pipe after cooling must not be so hot that the heat transferred from the pipe to the coating composition will cause the composition to bubble and thereby form blisters and pinholes. In this regard, it is pointed out that the setting of some liquid coating compositions, for example, epoxy compositions, is an exothermic reaction thereby contributing heat build-up in the lining being applied, which heat build-up will raise the temperature of the coating composition above the temperature of the pipe and this may be sufficient to cause bubbling of the composition.

When epoxy-resin compositions (described more fully below) are utilized, it is preferred that the temperature of the pipe be within the range of about 180° F. to 205° F. when the coating is applied. The heat of the pipe at such temperatures is effectively used to accelerate the hardening reaction and does not cause the composition to bubble.

The number of degrees that the pipe is lowered will also depend on the moisture content of the pipe and the temperature to which it has been raised initially. Pipes with the higher moisture content which have been heated to temperature of about 250° F. to 300° F. or higher should have their tempreatures reduced by substantially more than 20° F., for example, by about 50° F-100° F. or even more.

The method of this invention can be used to good advantage to improve any coating process wherein a heat-hardenable liquid-coating composition is applied to the interior surface of a heated asbestos-cement pipe or similar object and wherein the layer of coating composition has a tendency to have blisters or pinholes formed therein due to water or gases being given off from the interior surface due to heat. Exemplary of the kinds of liquid-coating compositions that can be used are compositions comprised of either polyurethane, polyester, or epoxy liquid coating resins, the last mentioned being preferred.

Such preferred coating materials are those epoxy-based compositions which upon curing adhere firmly to the interior surface of the pipe, are resistant to chemical attack by neutral, acidic, or alkaline fluids, and which have low absorbency for water and aqueous solutions of acids or alkali. Generally, such compositions will be comprised of 55 to 85 percent of a mixture of epoxy resin and hardener with the ratio of epoxy resin to hardener being approximately stoichiometric and 15 to 45 percent silica.

Particular epoxy resins that can be used to good advantage in the practice of this invention are those diglycidyl ethers of bis-phenol A that have viscosities of the general order of 10,000 to 16,000 centipoise at 77° F. and that have an epoxide equivalent in the range of about 175 to 200. Such epoxy resins are readily available and identifiable in the trade as Jones Dabney Epi Rez 510, Ciba Araldite 9001, Shell Epon 828, Union Carbide Erla-2600, Erla-2400, and Erla-2774, and Reichhold Epotuf 6140.

Examples of hardeners that can be used in the coating compositions are diethylenetriamine and triethylenetetramine, the last-mentioned being a preferred hardener. The amount of hardener admixed with the epoxy resin preferably should be the stoichiometric amount needed to react with the resin to give the requisite chemical resistance. For best results a freshly prepared mixture of the epoxy coating composition containing a hardener should be applied to said surface substantially immediately after the components have been thoroughly mixed. The reason for this is that if too much time elapses between the mixing of the epoxy and the hardener, the coating composition will begin to set, and thereby prevent uniform distribution of the composition over the surface to be coated. Another disadvantage resulting from allowing the composition to prematurely set is that it will tend to stick to the coating equipment and prevent uniform flow of the composition through the equipment and perhaps even block it.

In addition to the epoxy resin and hardener, other components can be included in the coating composition. For example, it is expedient to add finely pulverized silica, for example, 15 micron silica, to the composition. Any silica that is readily dispersible in the uncured epoxy composition can be employed. The silica functions to extend the composition, has the property of slowing down the reaction between the hardener and the epoxy resin thereby aiding in controlling and handling the liquid composition, reduces shrinkage as the epoxy hardens and also reduces the water adsorption capacity of the plastic lining.

Other ingredients which can be added to the composition include pigments, inert extenders and reactive materials such as, for example, triphenyl phosphite.

The epoxy compositions described above can be at room temperature when applied to the pipe; however, the compositions which at room temperature are relatively thick viscous liquids should be heated so that they will flow more readily during application. Generally the viscous compositions should be heated to a temperature within the range of about 110° F. to 155° F. and preferably about 145° F. to 155° F.

Substantially immediately after cooling the heated pipe by at least about 15° F., a suitable coating material such as, for example, an epoxy composition of the kind described above, is applied to the interior surface of the pipe by spraying or other appropriate means. In order to uniformly distribute the coating material on the interior of the pipe and to maintain such distribution until a sag-free lining is formed, it is desirable to rotate the pipe about its longitudinal axis while the liquid coating is being applied. Preferably the longitudinal axis is aligned in a substantially horizontal plane and the pipe rotated without bouncing. The rotation should be continued until the coating composition has hardened to a state where it will not sag when the rotation is stopped.

The examples appearing below serve to illustrate the practice of this invention.

In each of the examples the temperature of the pipe wall is the temperature of the innermost portions of the wall as measured by one or more thermocouples buried in the wall. The amounts of the components which comprise the coating composition are given in parts by weight.

EXAMPLE I

An asbestos-cement pipe having an inside diameter of 5.85 inches and a wall thickness of 0.66 inch was heated in an oven until the wall reached a temperature of about 275° F. The pipe was maintained at a temperature in the neighborhood of 275° F. for about 44 minutes. The pipe was then transferred to an oven which had a temperature of about 190° F. and after about 23 minutes the temperature of the pipe wall had cooled to about 205° F. The heated pipe was removed from the oven and rotated about its cylindrical axis at a speed of about 200 revolutions per minute and there was applied to the interior surface of the rotating pipe a liquid coating composition comprised of 100 parts of Jones Dabney Epi Rez 510 epoxy resin, 12 parts of triethylenetetramine hardener and 60.4 parts of 15 micron silica. The composition was heated to a temperature of about 120° F. and applied to the interior surface of the rotating pipe along its entire length within about one minute after the pipe had been cooled to about 205° F. After applying the composition, rotation of the pipe was continued for a few minutes longer at which time the composition had hardened to the extent that the layer of coating did not flow or sag when rotation was stopped. There was thus obtained a lining having a uniform thickness of about 20 mils which was free of sags, ripples, pinholes, blisters and other surface irregularities.

EXAMPLE II

An asbesto-cement pipe of the kind described in Example I was heated in an oven until the wall reached the temperature of 220° F. Immediately after reaching 220° F., the pipe was cooled within about 10 minutes to a temperature of about 207° F. The heated pipe was then rotated about its cylindrical axis at a speed of about 485 revolutions per minute and lined with a liquid-coating composition comprised of 68 parts of Jones Dabney Epi-Rez 510 epoxy resin, 7.14 parts of diethylenetriamine hardener and 32 parts of 10 micron silica. The composition which was applied to the interior surface of the rotating pipe along its entire length within about one minute after the pipe had been cooled to 207° F. After applying the composition, the speed of rotation of the pipe was reduced to 216 revolutions per minute and rotation of the pipe was continued at this speed for about five minutes. The lining thus obtained was slightly tacky but did not run or sag and was free of blisters, pinholes and other surface defects or irregularities. The lining had a thickness of about 12 mils.

EXAMPLE III

An asbestos-cement pipe having an inside diameter of 8 inches and a wall thickness of 0.57 inch was heated in an oven until the wall reached the temperature of about 220° F. Immedaitely after reaching this temperature, the pipe was then cooled to a temperature of between about 187° F. and 201° F. over a period of about 10 minutes and upon reaching this temperature was rotated about its cylindrical axis at a speed of about 400 revolutions per minute. A coating composition at room temperature comprised of 52.7 parts of Shell Epon 828 liquid epoxy resin, 13.2 parts of triphenylphosphite, 4.1 parts of diethylenetriamine hardener and 30 parts of 10 micron silica was applied to the interior surface of the rotating pipe along its entire length within about one minute after the pipe had been cooled to said temperature. After applying the coating, the rotation of the pipe was slowed to 200 revolutions per minute and rotation at this speed was continued for five minutes after which a smooth lining free of blisters, pinholes or bubbles and having a thickness of 12 mils was obtained.

EXAMPLE IV

An asbestos-cement pipe having an inside diameter of 5.85 inches and a wall thickness of 0.72 inch was heated in an oven until the wall reached the temperature of about 270° F. The pipe was maintained at a temperature of within the range of 220° F. to 270° F. for about 30 minutes. The pipe was then cooled over a period of time of about 10 minutes to a temperature of 190° F. to 196° F. Immediately after the pipe was cooled to said temperature, it was rotated about its cylindrical axis at a speed of about 200 revolutions per minute and there was applied a coating composition having a temperature of 116° F. and comprised of 100 parts Union Carbide Erla 2772 epox resin, 12 parts of triphenylphosphite, 10.8 parts of triethylenetetramine hardener and 53.7 parts of silica to the interior surface of the rotating pipe along its entire length. After applying the composition, rotation of the pipe was continued for a few minutes longer at which time the composition had hardened to the extent that the layer of coating did not flow or sag when rotation was stopped. There was thus obtained a lining having a uniform thickness of about 15 mils which was free of sags, ripples, pinholes, blisters, and other surface irregularities. Following the same procedure, good quality linings having thicknesses of 23.5 mils and 40 mils were also made.

I claim:

1. In the process of lining a heated asbestos-cement pipe wherein a heat-hardenable liquid-coating composition is applied to the interior surface of the hot pipe as the pipe is being rotated about its longitudinal axis the improvement which comprises heating the pipe to raise the temperature of its innermost body portions to at least 220° F., maintaining the temperature of said body portions above about 220° F. for a period of time ranging from about 1 minute to about 300 minutes, cooling the pipe to lower the temperature of said body portions by at least about 15° F., and as the hot pipe is at said lower temperature, rotating the pipe and applying to the interior surface thereof a heat-hardenable liquid-coating composition.

2. A method according to claim 1 wherein the pipe is cooled to a temperature ranging from about 180° F. to about 205° F., wherein the coating composition is comprised of an epoxy-resin coating and a hardener and wherein the composition as it is applied to the interior surface of the pipe is at a temperature between about 110° F. and about 155° F.

3. A method for coating the interior surface of an asbestos-cement pipe or other open-ended hollow fibrocement object with a heat-hardenable liquid-coating composition comprising providing a cured open-ended hollow fibro-cement object having water contained within the wall of the object, heating the innermost body portions of said wall to a temperature within an initial temperature range to raise the temperature of said body portions to at least 220° F., maintaining the temperature of said body portions within said initial temperature range for a period of time substantially less than it takes the heat to completely dry the object, and cooling the said body portions to a temperature within a second temperture range to lower the temperature of the body portions by at least about 15° F. thereby readying the object for the substantially immediately application of a heat-hardenable liquid-coating composition to the interior surface thereof, the temperature within said second temperature range being sufficiently high to promote the setting of said composition when it is applied to said interior surface and applying the heat-hardenable liquid-coating composition to the interior surface of the object.

4. A method according to claim 3 wherein the body portions are cooled by at least about 20° F.

5. A method according to claim 3 wherein the initial temperature range, the period of time at which said body portions are maintained within said initial temperature range and the second temperature range are interrelated so that upon application of the composition to the interior surface of the object, the heat of the object will accelerate hardening of the composition to the extent that a smooth sag-free, bubble-free lining will be formed within a period of time of less than about 10 minutes.

6. A method according to claim 5 wherein the said composition is comprised of an epoxy resin coating and a hardener and wherein said second temperature range is about 180° F. to 205° F.

7. A process for lining the interior surface of an asbestos-cement pipe with a heat-hardenable epoxy liquid-coating composition which comprises providing a cured asbestos-cement pipe having moisture within the pipe walls, heating the pipe to a temperature higher than about 220° F., maintaining the temperature of the pipe above about 220° F. for a period of time less than it takes the heat to completely dry the pipe, and then cooling the pipe to a temperature within the range of about 180° F. to about 205° F., and as the temperature of the pipe is in said lower temperature range, rotating the pipe about its longitudinal axis and applying to the interior surface of the rotating pipe an epoxy liquid-coating composition comprised of an epoxy resin coating and a hardener, said composition having a temperature between about 145° F. and about 155° F. to form on said surface a smooth, uniform thickness, layer coating composition free of blisters, pinholes and other defects, and continuing the rotation of the pipe until the resin has hardened to the extent that said smooth layer of coating will not sag when rotation is stopped.

References Cited

UNITED STATES PATENTS 2,778,283   1/1957   Bettoli.
3,219,472   11/1965  Hucks _____ 117—47

ALFRED L. LEAVITT, Primary Examiner

C. R. WILSON, Assistant Examiner

U.S. Cl. X.R.

117—95